June 23, 1936.  E. N. KEMLER  2,045,474
DYNAMOMETER
Filed Aug. 9, 1934   2 Sheets-Sheet 1
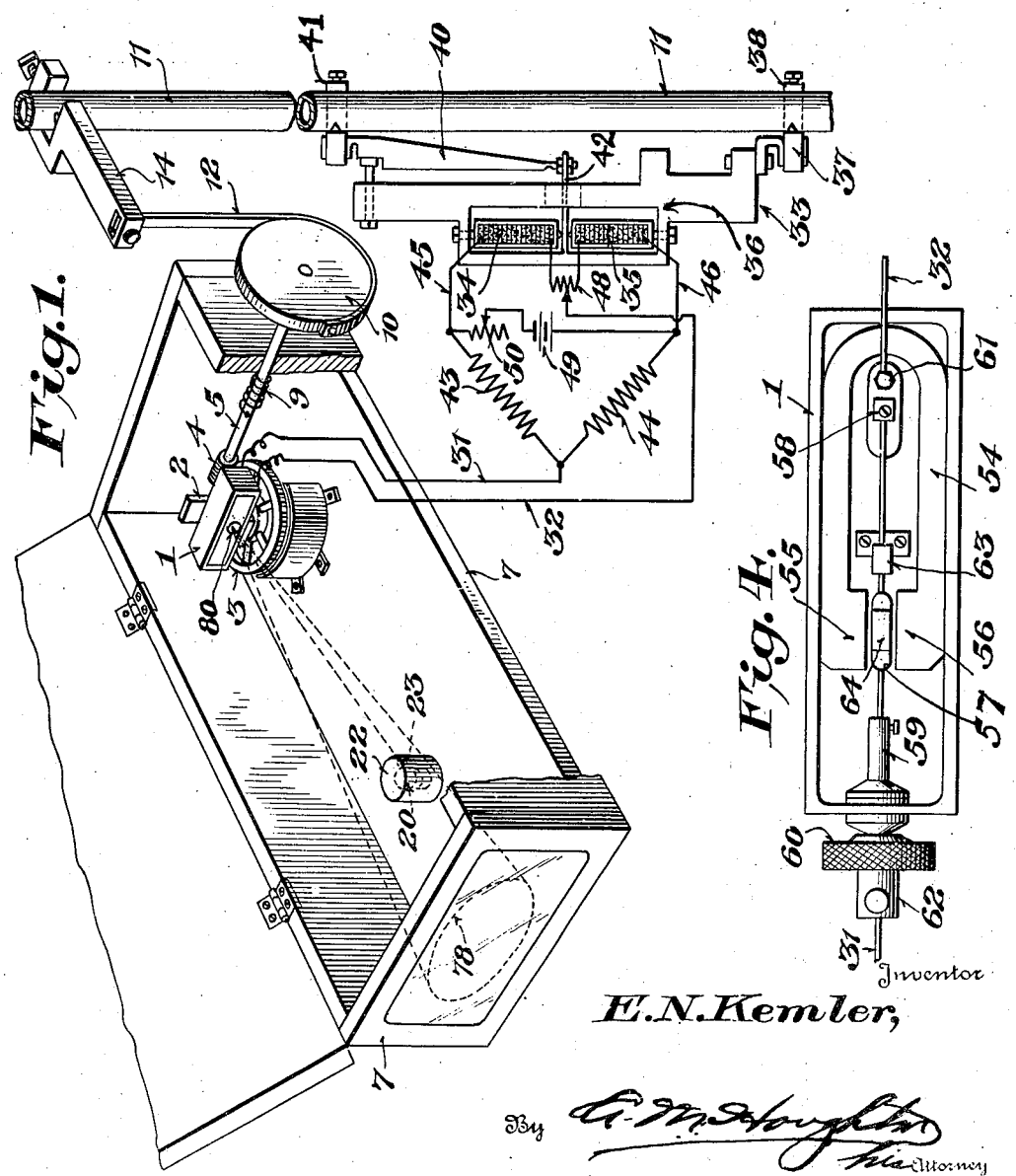
E. N. Kemler,

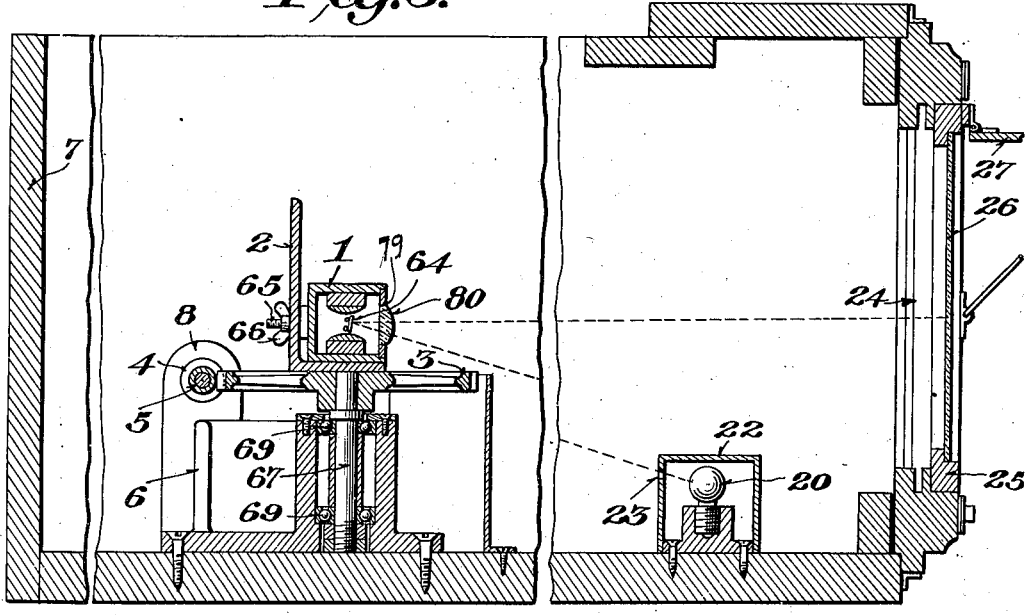
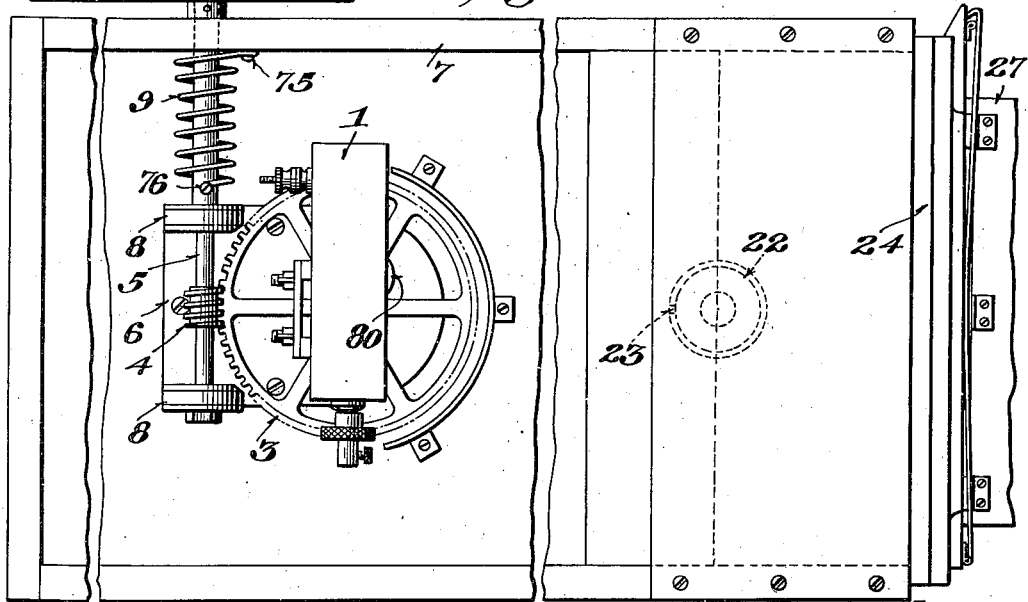

Patented June 23, 1936

2,045,474

UNITED STATES PATENT OFFICE 2,045,474

DYNAMOMETER

Emory N. Kemler, Pittsburgh, Pa., assignor to Gulf Research & Development Company, Wilmington, Del., a corporation of Delaware Application August 9, 1934, Serial No. 739,176

9 Claims. (Cl. 265—1)

This invention relates to dynamometers; and it comprises apparatus for measuring and recording strains, loads, or pressures in mechanism at all operating positions of the mechanism, the apparatus comprising electrical means adapted to be applied to an element of the mechanism under strain and to respond to variations in strains, loads or pressures therein, a galvanometer oscillograph element in circuit with the strain responsive means and adapted to produce an indication in one direction proportional to the strain, and means adapted to be connected to and to move with a moving part of the mechanism and adapted to cause a displacement of the oscillograph indicator in another direction proportional to the movement of the mechanism, so as to produce a compound indication of strain and movement; all as more fully hereinafter set forth and as claimed.

Reciprocating pumps usually comprise a cylinder and a piston working therein reciprocated by a suitable mechanical linkage. In the case of deep-well pumps the cylinder and piston are placed far down the well and the piston is reciprocated from the surface by means of a long string of sucker rods and a "polished rod" connected to a walking beam or crank-shaft operated by an engine. The polished rod is a member larger than the sucker rods and is connected to the walking beam at its upper end by a common bearing. The lower portion is guided in a stuffing box.

In analyzing the operation of pumps under working conditions it is desirable to make continuous measurements of the varying strain or load in some part of the mechanism, e. g. the polished rod or the walking beam, and simultaneously to measure the movement of the same part of the mechanism or of some corresponding part having a similar movement.

In the customary way of making such measurements, a dynamometer of some sort is inserted in the rod string. The dynamometer usually makes use of either a spring device, which changes its extension under varying strains in the rod; or a fluid pressure device, utilizing a flexible diaphragm for example, in which the pressure varies according to strains in the rod. In either case the dynamometer indicates or records the strain by means of a mechanical indicating device such as a linkage and pen, or a fluid pressure gauge. At the same time an indication of the movement of the rod is secured through another mechanical linkage of some sort. Sometimes the two indications are combined. From such measurements valuable inferences can be drawn as to the efficiency and other characteristics of the pump.

The mechanical indicator apparatus described, however, has inherent disadvantages, which hinder its use and which seriously detract from the value of measurements obtained therewith. There are practical disadvantages: the installation of the dynamometric device requires severing of the rod string. If the sucker rod position is changed by the installation of the spring or fluid pressure device, the characteristics of the pump as recorded by the dynamometer will be different from before the installation, and the dynamometer record will not give a true picture of the operation of the pump under working conditions. Mechanical dynamometers require the services of several men in the field. But the most serious defect is that mechanical strain responsive devices do not give an accurate record of the strain. This is because operation of the device itself changes the characteristics of the pump. Springs and pressure devices act as vibration dampers; they absorb or damp out any high frequency vibrations present and prevent their being recorded on the dynamometer. Whether the strain device is of the spring or the fluid pressure type, the damping effect may in extreme cases produce an error in the peak load indication of as high as 30 per cent. Moreover, the inertia and friction inherent in mechanical load indicating mechanism produce a lag in in recording; a phase displacement which results in the load being recorded in the wrong relation with respect to position or time.

In pump dynamometers, attempts have been made to obtain accurate strain records by utilizing non-mechanical strain responsive devices, which consume negligible power. The most practical of these proposals involves the use of an electric strain-responsive device of some sort, such as a carbon-pile resistance unit or a magnetic strain gauge clamped on the rod and electrically connected to a recording camera oscillograph: an electrical device adapted to respond to the minute current changes produced by the strain device and to give an indication proportional thereto, in the form of a spot of light moving over a rotating drum carrying a photographic film. The record produced by such apparatus is a periodic curve: a wavy line running along the film.

This system has the advantage that the strain response indications are accurate. Electric strain responsive devices, as distinguished from coil spring linkages and hydraulic pressure devices, do not change the characteristics of the pump. In a properly designed strain recorder and oscillograph combination lag can be eliminated.

There is the disadvantage, however, that movement cannot be directly and simultaneously recorded with this type of apparatus. In order to get a diagram or chart from which power can be measured graphically, it is necessary that the oscillograph record be measured and replotted. This is a time-consuming operation. It is almost impossible to measure and replot the high frequency variations with any useful degree of accuracy.

Another disadvantage is that the oscillograph is a costly and complicated piece of mechanism, the use of which presents difficulties in the field. Trained technicians are required to make the measurements and to put the results in useful form.

According to the present invention I provide an improved dynamometric apparatus adapted to respond electrically to strain or load, and to simultaneously respond to movement in the mechanism under test. The apparatus produces directly a compound record of strain and displacement in the form of a closed diagram, thereby eliminating the replotting operation necessary in oscillograph methods. The apparatus gives accurate records of strain versus displacement, and is simple and practical. The expensive oscillograph camera is done away with.

In the accompanying drawings I have shown, more or less diagrammatically, a specific embodiment of the invention. In this showing, Fig. 1 is an isometric diagrammatic view of the apparatus applied to a pump rod in operation, Fig. 2 is a plan view of the oscillograph element and its mountings, Fig. 3 is a plan view partly in elevation, partly in section, of the recording part of the apparatus, and Fig. 4 is a view in elevation of the oscillograph element.

In the figures, the apparatus is shown as comprising an oscillograph element in a case 1 mounted by means of a bracket 2 on a geared turntable 3 adapted to be rotated horizontally by a worm 4 mounted on a shaft 5. The turntable is rotatably mounted on a stationary base 6 positioned in a light-tight box 7. Shaft 5 is mounted in bearings 8 supported on the base of the turntable. A light coil spring 9 connecting the shaft and the box is adapted to exert a restoring torque on the shaft in one direction.

The shaft 5 extends through the box, as shown, and the outer end carries a pulley 10. Element 11 is a polished rod of a well pump, to which the apparatus is shown applied for the purpose of analyzing the operation of the pump. Pulley 10 is operatively connected to the polished rod by means of a flexible chain or tape indicated diagrammatically at 12, shown as connected to the polished rod by a detachable clamping device 14 attached to the rod. Reciprocating motion of the polished rod is thus transmitted through the chain or tape 12 to shaft 5 and serves to oscillate the turntable cyclically in a horizontal plane. Other mechanical coupling means may be provided for connecting the oscillograph element to the reciprocating member under test, so that the oscillograph element will be reciprocated by the member under test. Advantageously the linkage should be such that the motion of the turntable is directly (linearly) proportional to the motion of the part of the mechanism under test, to which it is connected; that is, a given displacement of the moving part under test should produce a corresponding displacement in the turntable in all positions of movement of each. The specific means described are of this type.

A lamp 20 is mounted in the box 7 as shown and is enclosed by a cover 22 provided with a small opening or slit 23 facing the oscillograph element. At the end of the box opposite to the turntable is an opening 24 adapted to receive a detachable frame 25 having a ground glass or celluloid screen 26 for visual observation, and when the frame is removed, to receive an ordinary plate or film holder (not shown) for making photographic records. A hinged cover 27 is provided for the frame. The arrangement is such that light from the lamp falls on the oscillograph element (to be described) and is reflected therefrom on the screen or plate holder.

The oscillograph element is connected by wires 31 and 32 to an electric strain-recording device 33 shown as comprising two carbon resistance piles 34 and 35 mounted in a frame 36 as shown. One end of the frame is integrally fixed to a C-clamp 37 removably clamped at one point on the polished rod, as shown, by a set-screw 38. The other end of frame 36 carries a flexible lever tongue 40 removably clamped to the polished rod by a C-clamp 41, as shown. A flexible tongue 42 connects frame 36 and member 40. Tongue 42 bears on the end of both resistance piles, as shown. Stresses in the rod are reflected in a microscopic elongation or compression of the portion of the rod between the two clamps, which in turn affects the pressure on the resistance piles and, in turn, the current passing through the piles. Resistance changes in the resistance piles are communicated to the oscillograph galvanometer through a modified Wheatstone bridge arrangement comprising two fixed resistances 43 and 44 connected to the resistance piles through wires 45 and 46, and to one side of the galvanometer through wire 31, as shown. The two resistance piles are also interconnected through a variable resistance 48, as shown, and to the other side of the galvanometer through wire 32. A battery 49 is connected across resistances 43 and 44 through a variable resistance 50, as shown. In operation, a change in relative pressures on the carbon piles 34 and 35 throws the bridge out of electrical balance, causing a current to flow through the galvanometer; this current being proportional to the pressure differential between the two resistance piles. The strain gauge shown is merely by way of example. Other strain-responsive devices, such as magnetic gauges, may be used. In some cases it is advantageous to provide an amplifier between the strain gauge and the galvanometer, but this is usually unnecessary.

The galvanometer element is shown in detail in Fig. 4. The instrument comprises a magnet 54 mounted in the case 1 and having two opposed poles 55 and 56 having a small clearance space between. A string galvanometer element is mounted between the poles; this comprises a loop or coil of wire 57 supported in the case by a fixed support 58 and by a rotatable supporting rod 59 frictionally mounted in the casing 1 and adapted to be twisted to different set angular positions by a knob 60, for adjustment purposes. Connections to the loop are made through the two supports, binding screws 61 and 62 being provided as shown. A damping vane 63 is provided as shown, for preventing undesirable vibrations of the loop. The loop carries a minute mirror 64. Upon passage of current through the loop, the wire loop in the magnetic field tends to twist, tipping the mirror in one direction or the other depending upon the direction of the current. The twisting of the mirror causes a shifting of the beam of light directed upon the mirror; a shift in the vertical plane, in the embodiment shown. The case 1 has a slit 79 opposite the mirror and a small lens 80 over the slit, as shown. The moving parts of the galvanometer are so minute that there is practically no inertial lag in the indication. Moreover, the motion of the parts (i. e. twisting of the loop) is accompanied by no friction, while the light beam pointer is of course frictionless and massless. Accordingly, the galvanometer and light beam indicator follow the response from the strain gauge practically instantaneously and with high accuracy.

The case 1 containing the oscillograph element is shown as adjustably attached to the bracket 2 by means of screw and nut 65, 66. The bracket is mounted on the horizontal table 3, which is rotatably mounted on a shaft 67 carried in ball bearings 69. The shaft 5 is also mounted in ball bearings. In Fig. 2, coil spring 9 is shown as fixed to the box by a screw 75 and to the shaft by a pin 76. The coil spring being light, and the mounting of the turntable and worm being substantially frictionless, the load put upon the mechanism under test is quite negligible.

The operation of the device is as follows: The pump being in operation, varying strains in the pump rod in different parts of the stroke are indicated by angular twisting of the oscillograph mirror in the vertical plane. This causes a spot of light from the lamp 20 to move up and down on the screen 26. At the same time, the oscillograph element is cyclically oscillated laterally by the turntable which is connected to the reciprocating pump rod. This causes the spot of light on the screen to move back and forth horizontally. The combined movement results in the tracing on the screen of a closed diagram shown as at 78. This diagram shows strain or load as ordinates, and displacement as abscissae. Power can be found directly by graphical methods, power being proportional to the area under the curve. Replotting, which is necessary in the usual oscillograph method, is done away with. The expensive oscillograph camera with its rotary drum and other complicated parts is not employed.

The apparatus is applicable to engines as well as pumps. "Strain" as used herein includes the effects of forces, pressures and loads of all kinds which occur in mechanism. The apparatus may be used in conjunction with testing machines, for drawing stress-strain diagrams; the electrical strain responsive mechanism in this case being applied to the piece under test and the turntable connected to a moving part of the testing machine. In some cases it is advantageous to provide for diagramming strains in different parts of the mechanism under test, at the same time. For example, two oscillograph elements may be mounted on the bracket of the turntable, and the two oscillograph elements connected to strain responsive devices in the polished rod and to the walking beam of a pumping rig, and strains simultaneously recorded. In engine analysis, where the strain to be recorded is pressure in a fluid rather than in a metal member, the electric strain responsive device may be enclosed in a pressure tube in hydraulic pressure-responsive connection with the engine cylinder. The apparatus then records pressure versus displacement. The apparatus may be used as a recording strain gauge by providing automatic mechanism for reciprocating or oscillating the turntable during recording of strain. This arrangement records strain in a closed diagram.

What I claim is:—

1. Apparatus for measuring strains in mechanism at all operating positions of the mechanism during operation and to produce a compound indication of strain and motion, said apparatus comprising means applied to an element of the mechanism under strain and producing an electrical response to rapid variations in strain without substantially affecting the operation of the mechanism, electrically operable means electrically connected to the strain responsive means and producing an indication in one direction proportional to the response of said strain-responsive means and means for simultaneously moving said indicating means in another direction, in a cyclically oscillating movement, proportionally to motion of a part of the mechanism so as to produce a compound indication proportional both to strain and to motion in the form of a closed diagram.

2. Apparatus for measuring strains in mechanism at all operating positions of the mechanism during operation and to produce a compound indication of strain and motion, said apparatus comprising means applied to an element of the mechanism under strain and producing an electrical response according to variations in strain without substantially affecting the operation of the mechanism, an oscillograph galvanometer element adapted to produce an indication in one direction proportional to the response of said strain responsive means and means for simultaneously moving said galvanometer element in another direction proportional to motion of a part of the mechanism so as to produce a compound indication proportional both to strain and to motion.

3. The apparatus of claim 2 wherein the means for moving the galvanometer element in the second direction comprises a rotary table upon which said element is mounted and mechanical coupling means adapted to connect said table to a moving part of the mechanism.

4. Apparatus for measuring strains in mechanism at all operating positons of the mechanism during operation and to produce a compound indication of strain and motion, said apparatus comprising an electrical strain gauge applied to an element of the mechanism under strain and producing an electrical response according to variations in strain without substantially affecting the operation of the mechanism, an oscillograph galvanometer element adapted to produce an indication in one direction proportional to the response of said strain gauge, means for simultaneously moving the galvanometer element in another direction proportional to motion of a part of the mechanism so as to produce a compound indication proportional both to strain and to motion and means for recording the compound indication photographically.

5. Apparatus for measuring strains in mechanism at all operating positions of the mechanism during operation and to produce a compound indication of strain and motion, said apparatus comprising means applied to an element of the mechanism under strain and producing an electrical response to variations in strain without substantially affecting the operation of the mechanism, electrical indicating means connected to said strain responsive means and adapted to produce an indication in one direction proportional to strain, the electrical indicating means being mounted for oscillatory movement in a direction different from the direction of indication, and mechanical means adapted to connect the indicating means with a moving part of the mechanism to oscillate the indicating means according to motion of the mechanism, to produce a compound indication proportional to both strain and motion and in the form of a closed curve.

6. Apparatus for measuring strains in mechanism at all operating positions of the mechanism during operation and to produce a compound indication of strain and motion, said apparatus comprising an electrical strain gauge applied to a part of the mechanism under strain and producing an electrical response to variations in strain without substantially affecting the operation of the mechanism, a galvanometer element connected to the strain gauge and adapted to produce an indication in one direction proportional to the response of the strain gauge, the galvanometer element being mounted for oscillation, mechanical coupling means for oscillating the galvanometer element and means connecting the coupling means with a moving part of the mechanism so that the galvanometer element is oscillated according to movement of the mechanism while the galvanometer indication takes place in a different direction, so as to produce a compound indication of strain and movement in the form of a closed curve.

7. Apparatus for measuring strains in mechanism at all operating positions of the mechanism during operation and to produce a compound indication of strain and motion, said apparatus comprising a strain gauge applied to an element of the mechanism under strain and producing an electrical response to variations in strain without substantially affecting the operation of the mechanism, a galvanometer element connected to the strain gauge and giving an indication in one direction proportional to the response of the strain gauge, the galvanometer element being mounted for rotation and including a mirror indicating means, a light source directing light on the mirror and thence on a screen as a moving spot and, mechanical coupling means connecting the galvanometer element with a moving part of the mechanism so that the galvanometer element is oscillated according to movement of the mechanism, so that a compound indication of strain and motion is produced on the screen in the form of a closed curve outlined by the moving spot of light.

8. Apparatus for measuring strains in mechanism at all operating positions of the mechanism during operation and to produce a simultaneous indication of strain and motion in the form of a closed curve defined by a moving spot of light, said apparatus comprising means applied to an element of the mechanism under strain and producing an electrical response to rapid variations in strain without substantially affecting the operation of the mechanism, a source of light, electrical means connected electrically with said strain responsive means for oscillating a beam of light from said source in one direction and to an extent proportional to said electrical strain response, a screen intercepting said beam of light and means for simultaneously causing oscillatory movement of said beam of light in another direction different from the first direction and proportional to motion of a part of the mechanism, to secure a compound indication in the form of a closed diagram on the screen.

9. Apparatus for measuring strains in mechanism and adapted to produce an accurate, compound indication of strain and motion in the form of a curve defined by a moving spot of light on a screen, said apparatus comprising means applied to an element of the mechanism under strain and producing an electrical response to rapid variations in strain without substantially affecting the operation of the mechanism, a source of light and a screen, electrically operable means electrically connected to the strain responsive means for directing an indicating beam of light from said source on to the screen and causing movement of the beam in one direction proportional to said strain response, said means being of a character introducing negligibly low inertial or frictional resistance and therefore responding to said strain response accurately and substantially instantaneously, and means for simultaneously causing oscillation of the beam of light cyclically in another direction different from the first to secure a two dimensional curved diagram of strain versus movement, the curve being defined by the beam of light moving over the screen.

EMORY N. KEMLER.